United States Patent [19]

Croll

[11] Patent Number: 5,013,145
[45] Date of Patent: May 7, 1991

[54] EYEGLASSES WITH LIQUID-FILLED LENSES

[76] Inventor: Theodore P. Croll, 4242 Mechanicsville Rd., Mechanicsville, Pa. 18934

[21] Appl. No.: 438,313

[22] Filed: Nov. 20, 1989

[51] Int. Cl.$^5$ .............................................. G02C 11/02
[52] U.S. Cl. ........................................ 351/52; 351/51; 351/158
[58] Field of Search ...................... 351/41, 51, 52, 158; 350/312, 418; 446/27

[56] References Cited

U.S. PATENT DOCUMENTS

| | | | |
|---|---|---|---|
| 3,614,215 | 10/1971 | Mackta | 351/41 |
| 4,261,655 | 4/1981 | Honigsbaum | 351/41 |
| 4,795,248 | 1/1989 | Okada et al. | 351/41 |

FOREIGN PATENT DOCUMENTS 530375  9/1956  Canada .................................. 351/44

Primary Examiner—Rodney B. Bovernick
Attorney, Agent, or Firm—Gregory J. Gore

[57] ABSTRACT

Novelty eyeglasses having decorative lenses include a parallel double lens system rigidly mounted in a frame creating an enclosed space between the lenses which is filled with a flowable liquid. Ports through the frame into the space provide for easy filling and refilling of the liquid and introduction of other elements, including floatable and non-floatable decorative materials. The fluid may further contain a coloration or dye to provide the lenses with a translucent tint. The tint color may be easily changed by merely replacing the liquid with that of a different color.

6 Claims, 1 Drawing Sheet

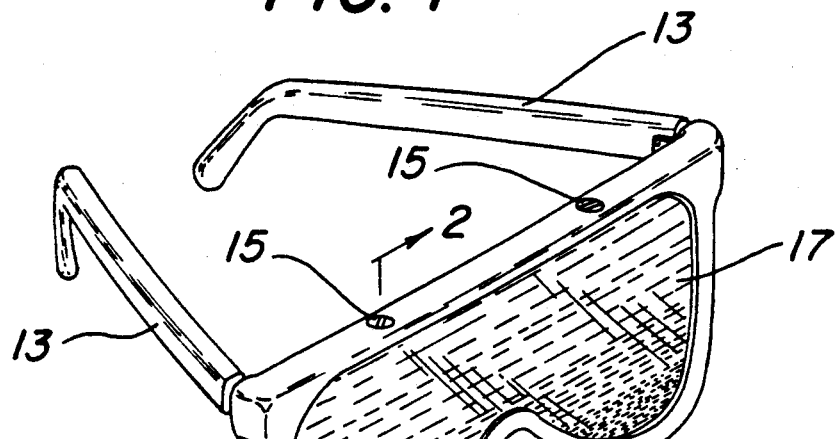
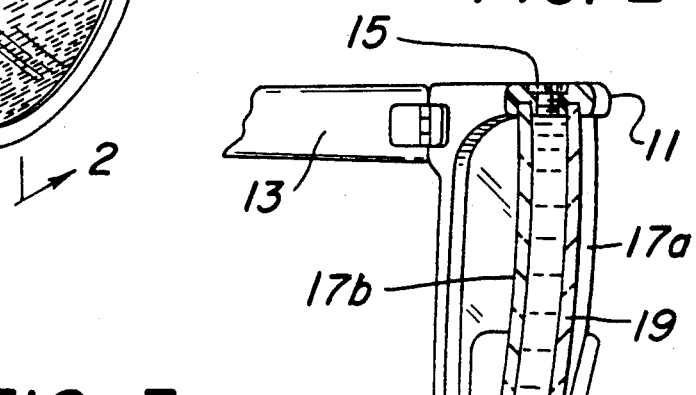
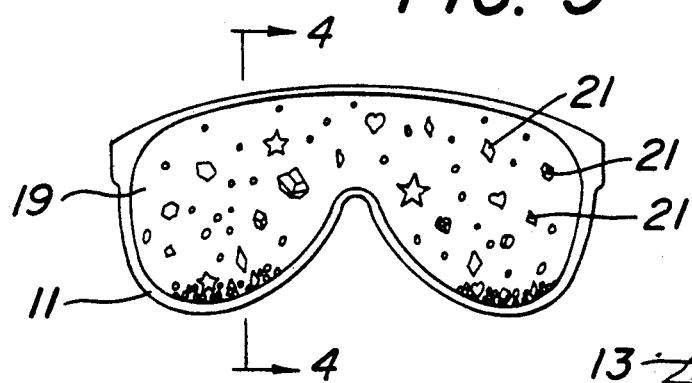
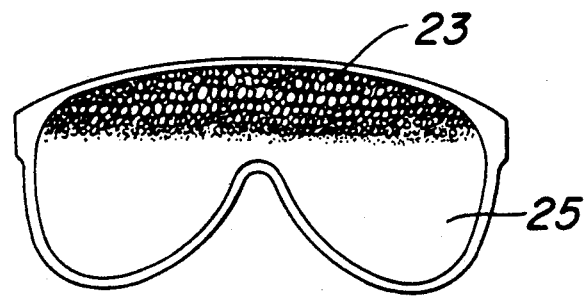
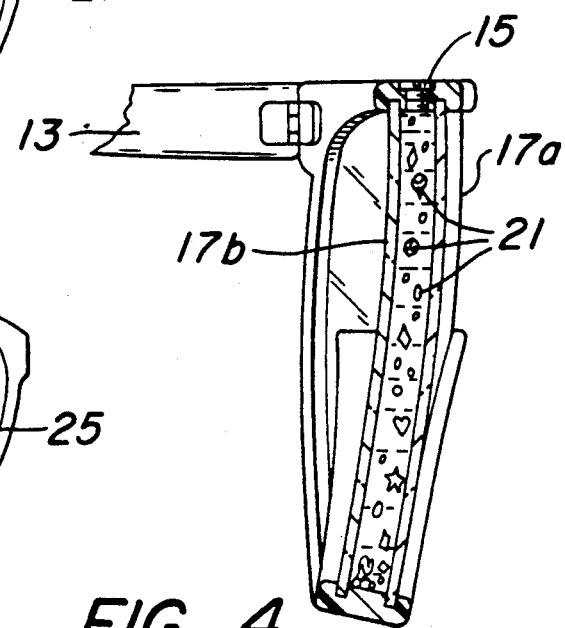

EYEGLASSES WITH LIQUID-FILLED LENSES

FIELD OF THE INVENTION

This invention relates to novelty eye wear and includes a unique system for decorating or coloring the lens area of eyeglasses.

BACKGROUND OF THE INVENTION

There have been numerous novelty eyeglasses and tinted sunglasses, which provide decorative effects. These usually included coloration or decorative elements added to or around the lens area and frames. Decoration or coloration of the lenses in the past has only been carried out by permanent lens coatings, or decorations applied to the surfaces of the lenses by adhesives. In these cases, the decorative elements remain stationary with respect to the eyeglass frames and, in most cases, are not permanent. The tinting or coloration of the lenses is usually permanent and a change in the lens tinting requires replacing the lenses. This can be very expensive in the case of prescription corrective lenses.

There is heretofore no known example of decorated eyeglasses which permitted the convenient use of the dynamic (i.e. non-static) decorative systems or the ability to change coloration or lens tint without replacement of lenses.

SUMMARY OF THE INVENTION

The present device provides both the ability to provide novelty eyeglasses decorated with moving elements, as well as the ability to change the tint, coloration or achieve other special effects without the replacement of the lenses. This is achieved by the use of a unique, double lens system having an interstitial space which is filled with a flowable liquid.

The eyeglasses further include means for emptying and refilling the liquid, whereby liquids having different degrees of opacity and coloration can easily be replaced to change lens coloration. Furthermore, as will be later described herein, other structures may be introduced into the liquid in order to produce unique and novel decorative effects. Other objects and advantages will be readily apparent to those of ordinary skill in the art from the foregoing drawings and description of preferred embodiments.

BRIEF DESCRIPTION OF THE DRAWINGS

FIG. 1 is a top, front isometric view of the present invention. p FIG. 2 is a left-side sectional view taken from FIG. 1 as indicated on that figure.

FIG. 3 is a front view showing an alternate embodiment of the present invention.

FIG. 4 is a left-side sectional view taken from FIG. 3 as indicated in that figure.

FIG. 5 is a front view of an alternate embodiment of the present invention.

DESCRIPTION OF THE PREFERRED EMBODIMENT

Referring now to FIG. 1, the eyeglasses of this invention appear very much conventional in their basic structure. A frontal frame 11 includes the usual hinge side pieces 13 and a frontal lens area 17. In this case, the surface of the lens covers both eyes and crosses over the nose bridge portion.

Referring now to FIG. 2, a unique double lens system including lens sections 17a and 17b are mounted within frame 11 and rigidly held a small distance apart creating a confined space therebetween. Access plugs 15 along the top of frame 11 open into the interstitial gap between the lenses. Flowable liquid 19 occupies the space between the lenses and can be introduced or removed from the gap through plugs 15. Liquid 19 is preferably a translucent fluid which may have any desired degree of coloration achieved by the addition of dyes. Furthermore, a second liquid of different density may be added to achieve a two-tone visual effect. The gap between lenses 17a and 17b can be as small as $\frac{1}{k}$ of an inch and, therefore, very little fluid is required to fill the entire surface of the lens area; hence, the liquid does not add an uncomfortable degree of additional weight to the eyeglasses.

Referring now to FIG. 3, an alternate embodiment of the eyeglasses is shown which includes particles 21 introduced into the liquid 19, which may be either buoyant or non-floatable. The particles can have various decorative shapes, such as stars, hearts or diamonds, etc. FIG. 4 shows the further detail of the location of these particles in the liquid-filled gap between lenses 17a and 17b. The particulate elements in this embodiment can be made from a variety of materials, including living organisms which may provide their own independent movement throughout the lens area. It will also be readily apparent that movement of non-living particles relative to the surrounding frame can be achieved by rapid head movement of the wearer.

FIG. 5 shows another embodiment of the present invention where the liquid is only partially filled leaving an air space above the top surface of the liquid along the top portion of the lens area. Additional dynamic effects can be achieved in this embodiment because the angle of the normally horizontal top surface of the liquid will change with tilt and head movement of the wearer. Furthermore, a detergent additive may be introduced into the liquid which, when shaken, produces a frothy foam in the air space for an additional decorative effect, such as the simulation of beer with a foam head.

It should be understood that the above description discloses specific embodiments of the present invention and are for purposes of illustration only. THere may be other modifications and changes obvious to those of ordinary skill in the art which fall within the scope of the present invention which should be limited only by the following claims and their legal equivalents.

What is claimed is:

1. Novelty eyeglasses, comprising:
   a. an eyeglass frame;
   b. a plurality of lenses rigidly mounted in said frame in substantially parallel spaced relation;
   c. a flowable liquid occupying the space between said lenses;
   d. access ports including closures located in said frame located to provide a conduit from the outside to the space between said lenses; and
   e. decorative particles within said liquid between said lenses.

2. The novelty eyeglasses of claim 1 wherein said decorative particles are living organisms.

3. The novelty eyeglasses of claim 1 wherein said liquid includes a dye to provide translucent coloration of the liquid.

4. Novelty eyeglasses, comprising:
   a. an eyeglass frame;

b. a plurality of lenses rigidly mounted in said frame in substantially parallel spaced relation;

c. a flowable liquid occupying the space between said lenses;

d. a visible air space between said lenses above the top surface of said liquid, such that changes in the angle of the top surface of said liquid are visible to the wearer of said eyeglasses when his head is tilted or moved; and e. buoyant, visually decorative particulate elements floating on the top of said liquid between said lenses.

5. The novelty eyeglasses of claim 4 wherein said liquid includes a detergent which will create foam in said air space when the eyeglasses are shaken.

6. Novelty eyeglasses, comprising:

a. an eyeglass frame;

b. a plurality of lenses rigidly mounted in said frame in substantially parallel spaced relation;

c. a flowable liquid occupying the space between said lenses;

d. access ports located in said frame located to provide a conduit from the outside to the space between said lenses; and e. a second liquid of different density than said flowable liquid, said second liquid also occupying the space between said lenses.

* * * * *